March 6, 1956  C. B. ROUNTREE  2,737,568

PROCESS FOR WELDING THIN SECTIONS OF SPRING STEEL

Filed April 17, 1953

INVENTOR.
C. B. ROUNTREE
BY
ATTORNEY

United States Patent Office 2,737,568
Patented Mar. 6, 1956

2,737,568

PROCESS FOR WELDING THIN SECTIONS OF SPRING STEEL

Calvin B. Rountree, Tappan, N. Y., assignor to The Western Union Telegraph Company, New York, N. Y., a corporation of New York Application April 17, 1953, Serial No. 349,463

12 Claims. (Cl. 219—10)

This invention relates to means for fastening to and for joining the ends of belts made of spring steel. Such belts are used in facsimile receivers, where they carry a plurality of writing styluses across the record medium in repetitive fashion. Accurate registration of the marks made by successive styluses being a necessity in this application, stylus holding metal blocks are fastened to the belt in locations which are predetermined to an accuracy of about one-thousandth of an inch. The belts operate over fixed pulleys at very high speed and are thus subjected to tension and to flexural and vibration fatigue.

Previous methods of fastening used on these belts have been spot welding, projection welding, and primarily riveting. Using the latter method, stylus blocks can be riveted in place on the belt using hollow rivets, so that sufficient accuracy and reasonable belt life are obtained at moderate belt speeds. Recent improvements in high speed recorders have increased their speed of operation to about ten times that of equipment formerly available. Residual stresses in the belt at the point of splicing and the inadequacies of riveting of the stylus mounting blocks to the belt have caused premature belt failure under these conditions for the following reasons.

When the belt is prepared by vigorously upsetting the rivets to ensure their continued tightness under all service conditions, it is found that the belt is warped in the neighborhood of the rivets and no longer rides flat over the pulleys. As a consequence, severe stressing of the warped portions of the belt takes place as the belt is flexed, and when operated at high speed, the belt is subject to early failure by fatigue rupture. Conversely, if the rivets are set up only tightly enough to retain the assembly in position without deforming the belt, the stylus blocks are found to creep under the stress of high speed operation by an amount, due to the necessary clearance provided in the rivet holes, while will render performance unsatisfactory by reason of failure of the several styluses to remain in registration, thus distorting the facsimile image.

Spot welding of the spring steel tape is unsatisfactory both in cases where the tape is welded to another section of the same material, as in making a butt joint with a butt strap for producing the continuous belt required, and in cases where a block of low carbon steel is welded to the belt for retaining the stylus. The difficulty encountered is that the metal of the spring steel belt becomes very weak and brittle in the region immediately surrounding the spot weld. This is apparently due to the fact that local fusion of the metal at the weld so heats the surrounding metal that its temperature far exceeds the gamma transformation range of the metal, thus coarsening the grain structure and causing embrittlement in the region which was heated, after the metal has air cooled. A well known treatment to restore the strength of metal in this condition involves heating it to a temperature within the gamma transformation range until the grain structure is refined, and then cooling it. This treatment is undesirable in the present circumstances not only because of the complex and tedious procedure and the bulky equipment of furnaces and pyrometers required, but especially because distortion of the belt in the form of warping occurs with the attendant disadvantages aforementioned, and also because of a loss of dimensional stability in the belt, observed as a change in its length as a result of the treatment, which adversely affects registration of the several styluses. Inasmuch as very accurate registration of the components affixed to the belt is required in order for a multiple stylus recorder to provide desirably high image definition, such a change in dimensions cannot be tolerated. Other methods of welding, brazing and hard soldering give rise to similar difficulties.

An object of the present invention is therefore to provide a method of making mechanical connection to a spring steel belt which does not cause weakening of the belt.

More particularly it is an object of this invention to provide a method of welding together thin spring steel stock, and of welding such stock to heavier ferrous sections, which does not deleteriously affect the metal in the neighborhood of the weld.

A further object of the invention is to make a strong and immovable connection to a spring steel belt without distorting it or changing its dimensions.

The stated disadvantages of the methods used in the prior art are overcome and the aforesaid objects of the present invention are accomplished by the use of a method of welding which introduces nickel in association with the parts to be welded by an improved procedure to effect a bonding of the parts through the penetration of the nickel into the weld.

A more complete understanding of the invention can be obtained by a consideration of the drawings in which.

Figure 1:
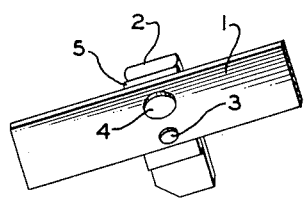
Fig. 1 is a perspective view of a completed weldment made according to the present invention.

Referring now to Fig. 1, reference numeral 1 denotes a belt of flat spring steel, onto which the stylus block 2 is secured. The stylus block 2 in this case is made of flattened cold drawn steel wire. Round slugs of welding material 3 and 4 later described are located on the side of belt 1 which is opposite to the stylus block 2, at the places where a spot weld is desired. Reference numeral 5 denotes a second piece of belt material somewhat wider than belt 1, included in cases where the belt is intended for operation at high speeds, and used to provide a hardened wearing surface for engagement with certain sliding belt guides not here shown, the entire assembly somewhat resembling a sandwich.

A substance for use as a welding material in the welded sandwich in conjunction with flat spring material and a mild steel block, or in conjunction with a flat spring and another piece of flat spring material, which presents unusual and very striking advantages, is pure sheet nickel. When a junction is to be made between two pieces of spring steel, two pieces of sheet nickel are used, one on each side of the parts to be joined. In using this method the nickel element need be no more than double the thickness of the spring material in order to develop the full advantages of this construction. Consequently, a desirably light and flexible junction of very high strength is obtained by its use. In this method of joining, a weld so consistently strong and uniform is obtained with the aid of further technique later explained, that it is unnecessary to remove the blueing from the spring in the region of the weld in order to obtain production entirely free of rejects, and as a consequence, the rust resistance of the spring steel which is imparted by the blueing remains unimpaired. This result is brought about by an alloying of the nickel with the material of the spring or springs and of the steel block, which accompanies the welding impulse, and by an improvement in the electrical admittance of the weld elements in the welding zone which results in a more consistent and more advantageous distribution of heat generated therein, and a greater concentration of heat along the center line of the weld. The result of these factors is that a superior fusion of the elements is obtained along and near the axis of the weld, with a lesser expenditure of electrical energy and consequently without burning and embrittlement of adjacent regions.

The element nickel alone among commonly available structural metals examined, is capable of producing this effect to any marked degree, and its performance is outstanding. Moreover, the nickel need not be in pure form for although results are best when pure nickel is used, various alloys of nickel such as austenitic stainless steel also give acceptable performance, to a degree dependent upon their nickel content. Such nickeliferous materials are considered to include all those having over about 15% metallic nickel in their composition.

The welding method of the present invention is capable of producing consistently sound welds showing penetration of both belt 1 and piece 5 and also of the stylus block 2. Slugs 3 and 4 are also penetrated by the weld and are firmly secured thereto by the welding process where they contribute additional strength to the weld both through their tensile resistance in a manner similar to that of a rivet head, and also by increasing the flexural resistance of the belt in the immediate neighborhood of the weld due to the mechanical support which they provide. It is for these reasons, in part, that the slugs must obviously be located external to the weld for best results. Additionally, the benefits of improved and facilitated penetration under low energy short time welding conditions, which characterize this invention, are not fully developed unless the slugs are so placed.

Figure 2:
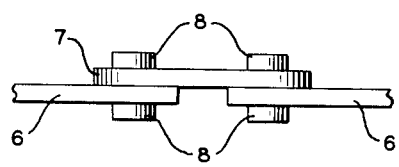
Fig. 2 is an edge view of another type of weldment made according to the present invention.

In Fig. 2 is shown a belt joint as used to produce a continuous belt loop. Reference numeral 6 denotes the body of the hardened spring steel belt which is joined to strap 7 made of the same material, by spot welds through the nickel-bearing sheet metal discs 8. It is to be observed that such discs or other configurations of welding material are to be used, as shown here, on the reverse as well as the obverse side of the welded material in cases where the member on the reverse side is made of material which is either hardened or is less than about five times the thickness of the spring steel member.

Figure 3:
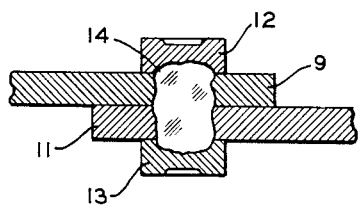
Fig. 3 is an enlarged sectional representation of a weldment made according to the present invention.

Fig. 3 represents a cross section of a welded joint between spring steel belts 9 and 11 made with the aid of nickel discs 12 and 13. Line 14 marking the margin of the weld is visible on the polished and etched surface of the sectioned sample and indicates adequate penetration throughout the weld zone. Alloying of the weld nugget with the nickel from the discs is also evident.

The increased electrical conductivity which should be expected of such a homogeneous and uniform strong joint is demonstrated by the fact that after one such weld has been made, another can not be made in the neighborhood of it by the use of the same elements, since the first weld acts as a shunt path for the welding current and prevents satisfactory fusion in the second joint. This is in contrast to the ordinary spot weld which can be made close to a preexisting spot weld without difficulty. Where it is desired to space the weld spots close together, or for purposes of economy with regard to the sheet nickel used, it is satisfactory to include and preferred to apply the nickel in the form of a small disc, which need be only slightly larger in diameter than the welding electrode tip. By this means the welding current is confined to a path directed inward from the point of electrode application, and cannot spread laterally through the nickel to an adjacent weld, since only one weld is made through each disc.

It is desirable that the pieces to be welded together be thoroughly cleaned prior to the welding operation in order that the resistance presented between the electrodes of the welder may be retained at a constant low value from piece to piece. This is required because both welding current and welding time are affected by the value of this resistance. Such cleaning can be accomplished by washing the parts in trichlorethylene or by vapor degreasing them with the same chemical, followed by rinsing in ethyl alcohol and drying them.

Figure 4:
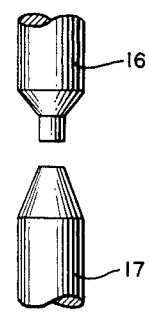
Fig. 4 is an elevation view of the welding electrodes used in practicing the present invention.

Fig. 4 is an orthographic representation of a desirable form and arrangement of welding electrodes made of hard copper for the practice of the present invention, in which reference numeral 16 indicates the upper and 17 the lower electrode.

The eletcrodes of the welding machine are to be carefully aligned, and burnished on the operating faces, which are 0.090 inch in diameter, the lower electrode being frustoconical in shape at the operating end and the upper electrode being cylindrical for a length of about two diameters and frustoconical thereabove.

Spattering of metal from the weldment is avoided by use of the correct polarity, the lower nickel disc and lower electrode being positive in the examples described.

It is important that welding time be held to a very low value in order to achieve optimum results by this process. Commercial spot welders generally available and controlled by relays can be adjusted for timing as short as 1½ cycles at 60 cycles per second, under which adjustment they produce their best results in this application. However, since the actual welding time as measured can vary by some 30% from the nominal setting, in an erratic fashion, it is advantageous to provide a shorter and more accurately adjustable welding time, while increasing the welding current to maintain the energy discharge at a value sufficient to fuse the material in the welding zone. This is done by charging a bank of capacitors of appropriate value from a direct current source, then discharging them through the primary winding of the spot welding transformer at the time when welding current is desired.

Figure 5:
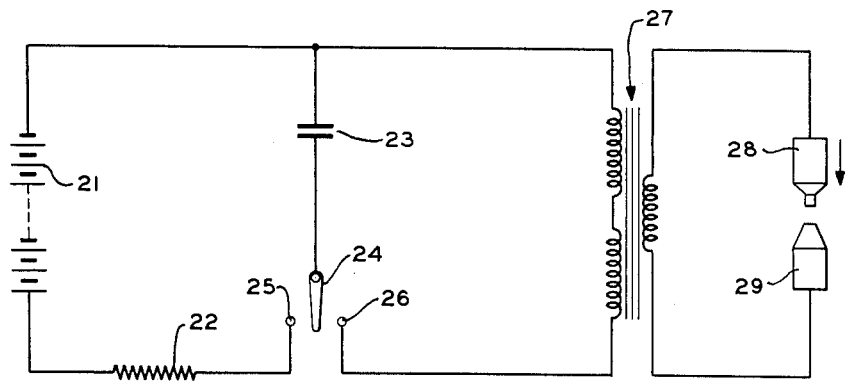
Fig. 5 is a schematic representation of the electrical circuit used in a welding machine for practicing the present invention.

Fig. 5 is a schematic diagram of the electrical circuit employed in welding by condenser discharge according to the method of the present invention. A battery 21 or other source of direct current capable of supplying a potential in the neighborhood of 600 volts is connected in series with the resistor 22 of about 1000 ohms resistance to charge the condenser 23 when switch 24 is thrown into contact with terminal 25. An appropriate value for condenser 23 is 380 microfarads, when used with a spot welding machine designed for operation on 220 volts 60 cycles per second alternating current. When condenser 23 is thus charged to the voltage of supply 21, the material to be welded is inserted between electrodes 28 and 29, and a force of about 13 pounds applied in the direction of the arrow shown. Switch 24 is then thrown to contact terminal 26, discharging condenser 23 through the primary of welding transformer 27 and inducing welding current to flow in the secondary winding thereof. A welding current of 3000 amperes having a duration of five milliseconds can be produced in this way, which results in consistently sound welds being made.

It is necessary, in order that the full advantages of this novel method of welding be realized, for the welding time to be as short and for the energy supplied to the welding machine in making each spot weld, to be as small as is consistent with thorough fushion of the weld elements. Appropriate values have been given which are satisfactory for elements of the size and kind described. Other assemblies will require different values of these parameters for optimum performance. In general, excessive current and time are indicated by sparks, smoke, and in extreme cases, burning of the spring metal. Inadequate values are shown by imperfect adhesion of the nickel discs and by weak welds. Acceptable values lie between these extremes, and are relatively low in comparison with normal spot welding requirements for the same gage materials. As thus accomplished, the weld occurs without visible fire or smoke, and the welded material remains cool to the touch, indicating that little energy is expended in producing extraneous effects, and that high efficiency is obtained in consequence. It is by thus closely confining the welding heat to the region of the weld that burning, warping, weakening and embrittlement of the spring steel member are obviated.

It will be obvious that various modifications and changes in the invention shown in the drawings and described herein can be made without departing from the spirit or essential attributes of the invention, and it is therefore intended that only such limitations be placed thereon as are specifically set forth in the appended claims.

What is claimed is:

1. The method of securing together a plurality of ferrous members including a spring steel strip which comprises arranging the said members in a stack having the desired final relationship, providing nickel in superposed layer form external the spot to be joined, and applying resistance welding means energized by capacitive discharge thereto for interfusion thereof.

2. The method of electrically resistance welding ferrous members including at least one thin strip of relatively high carbon content spring steel having a hardness between approximately 45 and 55 Rockwell C scale which comprises arranging the ferrous parts to be joined in a stack having the spatial relationship of the finished weld and having at least one of said strips on the exterior of the stack, applying a piece of metal containing a substantial proportion of nickel external to each of such strips which is on the exterior of said stack, applying predetermined pressure to the assembly by and between the electrodes of a welding machine, and discharging a predetermined electrical energy impulse of short duration through the stack from a transformer energized by a condenser discharge, whereby a weld through the said stack and the said pieces of metal is made without substantial weakening, warping or embrittlement of the said thin strip.

3. The method of electrically resistance welding ferrous members including at least one thin strip of relatively high carbon content spring steel having a hardness between approximately 45 and 55 Rockwell C scale by means of a current impulse applied thereto through spot welding electrodes which comprises cleaning by means of a volatile lipotropic solvent the metal parts to be joined, aligning such parts including the said spring steel between the said electrodes, inserting a tab of sheet metal largely composed of nickel between each such electrode and every adjacent relatively thin part to be joined, applying a predetermined clamping force between the said electrodes, and passing a condenser discharge welding current of predetermined energy content and short duration therebetween for welding together the said ferrous members and the said tabs of sheet metal.

4. The method of spot welding joints in a clean spring steel belt comprising placing the ends of said belt in alignment, applying a butt strap of the same material thereon, applying at the places to be welded tabs of nickeliferous material of a size sufficient to completely cover each weld spot on both sides thereof for permanent adhesion exterior thereto, compressing the same to a predetermined welding pressure in a spot welding machine having a transformer with a primary winding therein, and completing each weld spot successively by the discharge of a condenser into the said primary winding of the said transformer.

5. The method of electrically resistance welding a hardened spring steel belt member to at least one other ferrous member including a relatively thick mild steel member which comprises stacking the said members in final relationship having said belt member and said mild steel member on the exterior thereof, positioning in contact with and external to the said belt member, an auxiliary member for permanent attachment comprising a sheet of metal containing a substantial proportion of nickel, clamping the said stack and the said auxiliary member together with welding pressure, and passing therethrough a condenser discharge to produce a welding current of high intensity and short duration.

6. In a closed belt of spring steel having a hardness between 45 and 55 Rockwell C scale approximately, a spot welded joint comprising aligned ends of the said belt, in substantial abutment, a separate superposed strap thereon composed of the said spring steel, overlying and underlying portions of nickeliferous metal fusibly adhered thereto, and a plurality of weld nuggets consisting of a nickel iron alloy traversing the said belt ends and the said straps, and penetrating the said portions of nickeliferous material, characterized by the fact that flexibility and strength of the said belt are substantially preserved.

7. In a closed belt of spring steel having a hardness between 45 and 55 Rockwell C scale approximately, a spot welded joint comprising overlapped opposing ends of the said belt, overlying and underlying portions of nickeliferous metal fusibly adhered thereto, and at least one weld nugget consisting of a nickel-iron alloy traversing the thickness of the said belt ends and penetrating the said portions of nickeliferous metal, said joint being characterized by the fact that flexibility and strength of the said belt are substantially preserved.

8. In a spring steel belt for translating the styli of a facsimile transducer, said belt having a hardness of 45 to 55 Rockwell C scale, a union thereto of a stylus holding block of low carbon steel comprising a said block on one side of the said belt and a nickeliferous plate on the other side of the said belt, each secured thereto by a weld nugget of autogenous nickel iron alloy penetrating the said block and the said plate and traversing the said belt, the said union being characterized by the fact that flexibility and strength of the said belt are substantially preserved through weld nuggets having relatively small volume and relatively small change of composition of the kind induced by thermal soaking.

9. A method of spot welding joints in spring steel belts, which includes arranging the ends thereof in final joint relation, assembling thereon applique means comprising nickeliferous welding metal external thereto, applying electrode pressure to the assembly at the spots to be joined, and passing an assembly homogenizing spot welding current derived from condenser discharge means therethrough for interfusion thereof.

10. The article of claim 7 wherein the said nickeliferous metal comprises nickel of substantially twice the thickness of said steel belt.

11. The article of claim 7 wherein the said nickeliferous metal comprises nickel-bearing austenitic stainless steel.

12. The article of claim 7 wherein the said nickeliferous metal comprises nickel silver.

References Cited in the file of this patent

UNITED STATES PATENTS

| Number | Name | Date |
|---|---|---|
| 249,909 | Donahue | Nov. 22, 1881 |
| 1,056,061 | Rogers | Mar. 18, 1913 |
| 1,190,208 | Williams | July 4, 1916 |
| 1,308,781 | Grovell | July 8, 1919 |
| 1,312,844 | Grovell | Aug. 12, 1919 |
| 1,802,829 | Pierce, Jr. | Apr. 28, 1931 |
| 2,145,724 | Horsley | Jan. 31, 1939 |
| 2,250,617 | Argentin | July 29, 1941 |
| 2,589,015 | Merz | Mar. 11, 1952 |

FOREIGN PATENTS

| 215,100 | Switzerland | Sept. 1, 1941 |